United States Patent [19]

Wigal

[11] 3,946,711
[45] Mar. 30, 1976

[54] HYDROGEN FIRED IGNITION SYSTEM FOR INTERNAL COMBUSTION ENGINES

[76] Inventor: Voorhis F. Wigal, 909 Highland Ave., Jackson, Tenn. 38301

[22] Filed: Apr. 8, 1974

[21] Appl. No.: 458,816

[52] U.S. Cl. ....... 123/119 E; 123/32 SP; 123/143 B; 123/144; 123/DIG. 9
[51] Int. Cl.² .......................................... F02B 33/00
[58] Field of Search ....... 123/142 B, DIG. 9, 119 E, 123/139 AD, 32 SP, 144

[56] References Cited
UNITED STATES PATENTS

| | | | |
|---|---|---|---|
| 1,700,603 | 1/1929 | Vreeland et al. | 123/143 B |
| 1,957,541 | 5/1934 | Johnson | 123/32 SP |
| 2,019,650 | 11/1935 | Bischof | 123/139 E |
| 2,396,602 | 3/1946 | Posch | 123/139 |
| 3,311,097 | 3/1967 | Mittelstaedt | 123/119 E |
| 3,459,953 | 8/1969 | Hughes et al. | 123/119 E |
| 3,710,764 | 1/1973 | Jozlin | 123/DIG. 9 |
| 3,853,097 | 12/1974 | Kume | 123/DIG. 9 |

FOREIGN PATENTS OR APPLICATIONS

| | | | |
|---|---|---|---|
| 226,766 | 8/1923 | United Kingdom | 123/143 B |
| 364,555 | 8/1906 | France | 123/143 B |
| 869,297 | 1/1942 | France | 123/143 B |

*Primary Examiner*—Charles J. Myhre
*Assistant Examiner*—Paul Devinsky
*Attorney, Agent, or Firm*—Browdy & Neimark

[57] ABSTRACT

An ignition system for internal combustion engines comprises a spark plug located remote from the combustion chamber, a metering pump which supplies a mixture of hydrogen and oxygen gases to the remote spark plug and a capillary-like tube for projecting an explosive flame front, created by the ignition of the hydrogen and oxygen gases, into the combustion chamber to ignite a vaporized fuel-air mixture.

6 Claims, 9 Drawing Figures

POWER

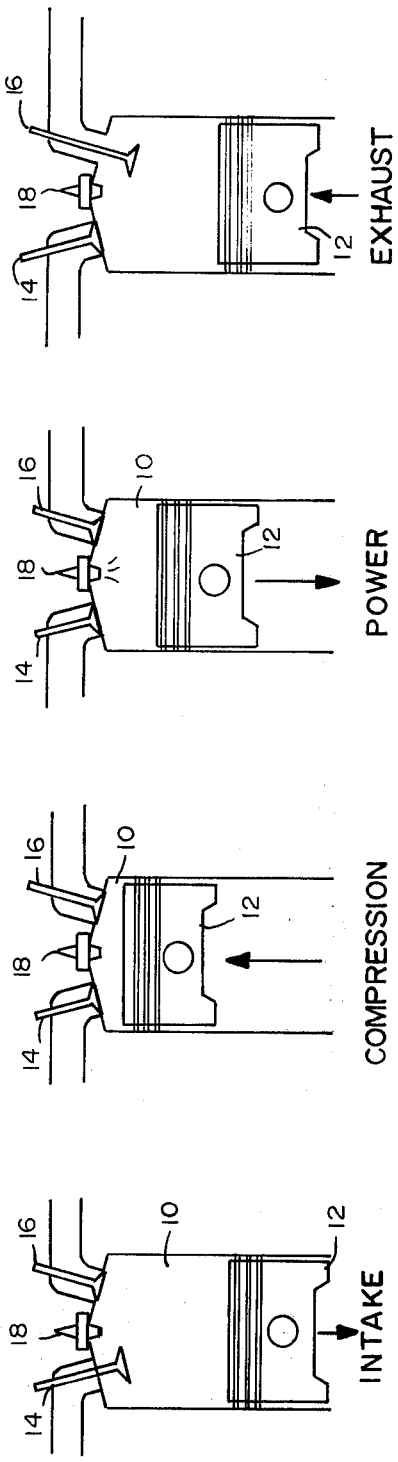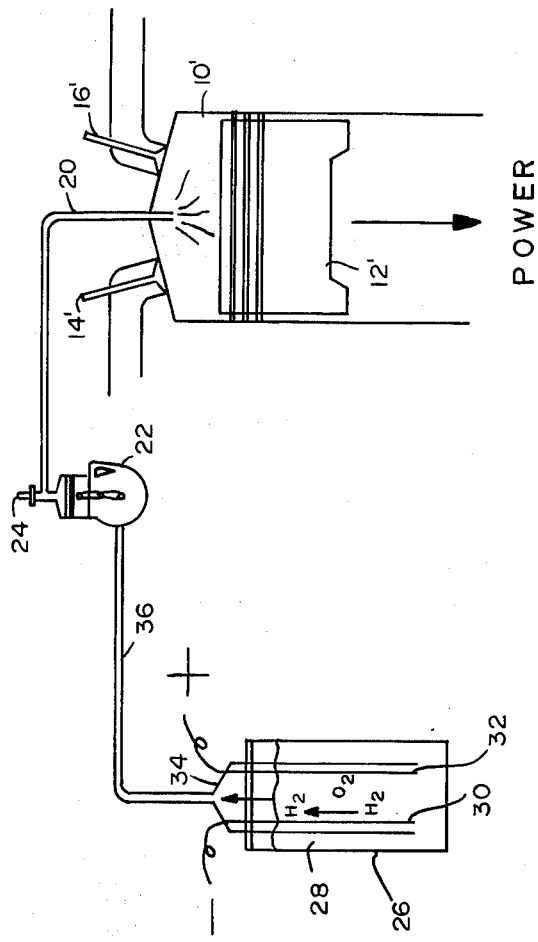

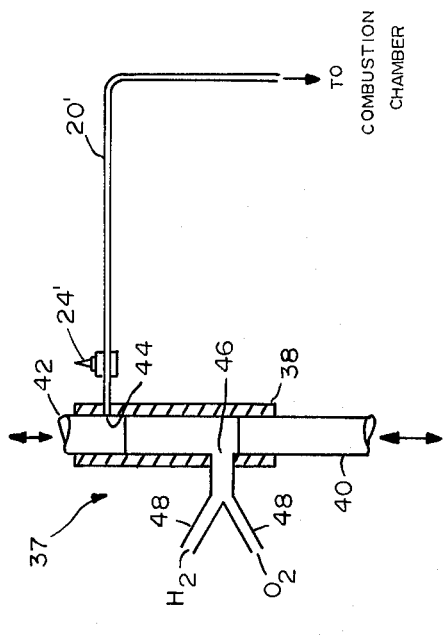
FIG. 7
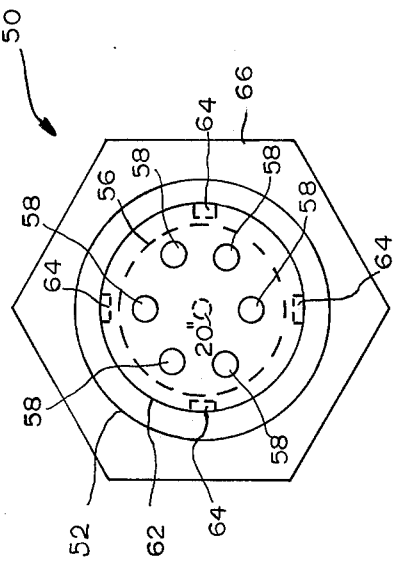
FIG. 9
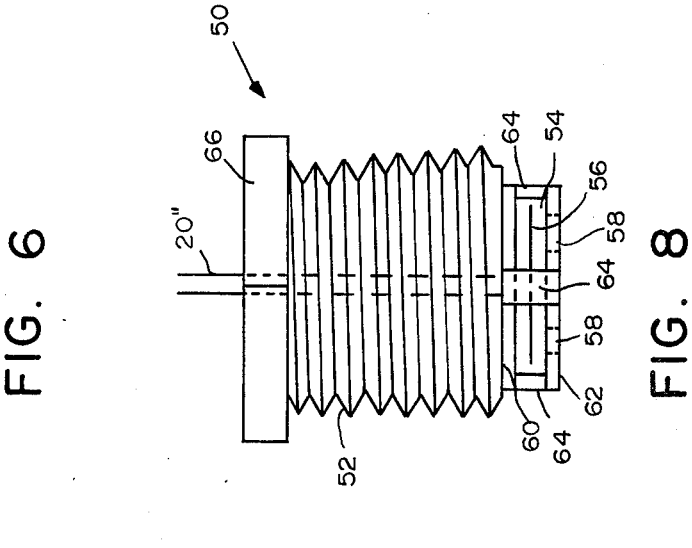
FIG. 6
FIG. 8

HYDROGEN FIRED IGNITION SYSTEM FOR INTERNAL COMBUSTION ENGINES

FIELD OF THE INVENTION

The present invention relates to a hydrogen fired ignition system for firing the combustible charge in conventional internal combustion engines and, more particularly, such engines which use petroleum products (or other liquid fuels) which form explosive mixtures when vaporized in air.

BACKGROUND OF THE INVENTION

Referring now to FIGS. 1 through 4, there is shown the normal sequence of operation for a typical 4-cycle internal combustion engine. On the intake stroke (FIG. 1), an explosive mixture of vaporized fuel, such as gasoline, and air is drawn into the cylinder 10 through the open intake valve 14 as the piston 12 moves downward. On the compression stroke (FIG. 2), the intake valve 4 is closed and the piston 12 rises to compress the fuel-air mixture. On the power stroke (FIG. 3), the compressed fuel-air mixture is fired or ignited by an electric arc across the gap of a spark plug 18, thereby propelling the piston 12 downward. On the exhaust stroke (FIG. 4), the piston 12 travels upward expelling the burned gases through the open exhaust valve 16. After the burned gases have been expelled and the exhaust valve 16 closes, the piston 12 moves downward and the cycle is repeated.

A major disadvantage of such conventional internal combustion engines is the inability of the electric spark to generate an instant flame front with sufficient magnitude to provide efficient combustion of the fuel-air mixture. This incomplete combustion is characterized by a high percentage of unburned hydrocarbons resulting in wasted fuels and polluting gases which are discharged into the atmosphere.

Heretofore, prior art devices have attempted to eliminate these disadvantages by utilizing auxiliary or pre-combustion chambers. The prior art pre-combustion chambers, such as described in U.S. Pat. No. 3,066,661, function to ignite a fuel-air mixture which has a concentration that may be different from the fuel-air mixture in the main combustion chamber.

These prior art pre-combustion chambers suffer due to the following disadvantages. Firstly, such pre-combustion chambers must be of a sufficient size to hold the relatively large volume of fuel and air required to create a flame front of sufficient magnitude to cause complete combustion of the fuel-air mixture in the main chamber. Secondly, such large volume pre-combustion chambers make complete purging after firing difficult.

SUMMARY OF THE INVENTION

A principal object of the present invention is to overcome the defects of the prior art, such as indicated above.

Another object of the present invention is to provide an improved firing system for internal combustion engines.

Another object is to provide a hydrogen fired ignition system for firing the fuel-air mixture in internal combustion engines which greatly magnifies the initial flame front in the combustion chamber and permits utilization of a relatively lean fuel-air mixture, thereby resulting in an increase in efficiency and a decrease in the emission of polluting gases.

A further object is to provide a firing system for internal combustion engines which avoids any redesign of the engine itself and accomplishes the desired results by relatively simple replacements which do not necessitate mechanical changes other than the readjustment of the fuel-air ratio, in the combustion chamber or in the carburetor system.

Yet another object of the present invention is to avoid the use of exotic fuels that would not be readily available and those that would be difficult or hazardous to handle.

In furtherance of these and other objects, a principal feature of the instant invention is an ignition system for internal combustion engines in which hydrogen and oxygen are used in minute quantities, not as prime fuel, but in a catalytic reaction for amplifying the relatively small spark from the igniter into a flame front of such magnitude that it fires the conventional fuel-air mixture in the main combustion chamber. Another feature is that the quantities of hydrogen and oxygen required are of such low order that they can be supplied from a small and easily carried electrolytic generator or other type hydrogen generator, at the rate of demand, so that large reservoirs or high pressure storage tanks are not required. Yet another feature is the absence of nitrogen bearing air mixed with hydrocarbon fuel vapor in the area of the arc of the igniter at the moment of firing.

The hydrogen fired ignition system of the instant invention is characterized by an ignitor or sparking means located remote from the combustion chamber, a metering pump which supplies a mixture of hydrogen and oxygen to the remote igniter and a capillary tube for projecting an explosive flame front, created by the ignition of the hydrogen and oxygen gases, into the combustion chamber to ignite the vaporized fuel-air mixture therein. The hydrogen and oxygen may be supplied by a simple electrolytic cell which is connected to the metering pump.

For a better understanding of the invention, a possible embodiment thereof will now be described with reference to the attached drawing, it being understood that this embodiment is intended to be merely exemplary and in no way limitative.

BRIEF DESCRIPTION OF THE DRAWING

FIG. 1 is a diagram illustrating the intake stroke of a typical 4-cycle internal combustion engine.

FIG. 2 is a diagram illustrating the compression stroke of a typical 4-cycle internal combustion engine.

FIG. 3 is a diagram illustrating the power stroke of a typical 4-cycle internal combustion engine.

FIG. 4 is a diagram illustrating the exhaust stroke of a typical 4-cycle internal combution engine.

FIG. 5 is a schematic diagram of one embodiment of the hydrogen fired ignition system of the instant invention as applied to a single piston cylinder in an internal combustion engine.

FIG. 6 is a schematic diagram of one possible embodiment of a metering pump at the instant of firing.

FIG. 7 is a diagram of the metering pump of FIG. 6 after firing.

FIG. 8 is an elevational view of one possible embodiment of a valve which connects the capillary or firing tube to the combustion chamber.

FIG. 9 is a bottom view of the valve shown in FIG. 8

DETAILED DESCRIPTION

Referring now to FIG. 5, the igniting spark plug 24 is completely removed from the combustion chamber of the piston cylinder 10'. In its place is a relatively small capillary-like tube 20. A metered mixture of hydrogen and oxygen gases is delivered through tube 20 to the combustion chamber by a small pump 22 at a pressure that is higher than that of the vaporized fuel-air mixture in the cylinder 10' when the piston 12 is at the top of the compression stroke. The metering pump 22, a possible embodiment thereof being described in detail hereinafter, also acts as a shut-off valve to prevent the backfiring of the hydrogen-oxygen charge into the feed line 36. Moreover, the pump is timed (by a linkage mechanism connected to the existing cam shaft or other synchronized member) to deliver the hydrogen-oxygen mixture at the highest pressure just prior to the firing of spark plug 24.

By employing a capillary-like tube having a small inner diameter, rather than a conventional pre-combustion chamber, a low volume of the hydrogen-oxygen mixture may be easily maintained. Also, the capillary-like tube is more easily and completely purged by the metering pump after each firing.

A capillary or firing tube 5 inches long and having an inner diameter of 0.03 inches and a total volume of 0.005 cubic inches has been found to work satisfactorily. Because a relatively small tube may be used with effective results, the volume of the hydrogen-oxygen mixture is quite small in relation to the fuel-air mixture it fires. Therefore, in the present embodiment, only the hydrogen and oxygen gases surround the spark gap at ignition. At the moment of detonation they recombine to form a small amount of water which is exhausted as high temperature vapor which adds no noxious pollutants to the exhaust. The minute quantity of completely dispersed water vapor gives some benefits of water injection without the disadvantages normally associated with that operation.

The hydrogen-oxygen mixture may be supplied by a simple electrolytic cell 26. When used in conjunction with a vehicle, the electrolytic cell may be powered by the direct current from the vehicle's electrical system. More particularly, when a direct current is passed through the cell's water 28 which contains a small amount of sodium hydroxide (or other electrolyte) hydrogen is liberated at the cathode 30 and oxygen at the anode 32. Since the electrolytic cell forms the hydrogen and oxygen gases in stoichiometric proportions, they are easily recombined in the proper ratio when captured by collector 34. Upon collection the hydrogen and oxygen gases may be supplied to the metering pump 22 through the feedline 36 or any other suitable means. The rate of formation of hydrogen and oxygen in the electrolytic cell may be automatically adjusted to the demand, so that a large reservoir is not required. Therefore, to ensure a constant supply of hydrogen and oxygen, only replenishment of the water in the electrolytic cell is required.

The sequence of the operating cycle remains the same as in the conventional internal combustion engine described hereinabove. However, the normal spark is now instantly, upon detonation of the hydrogen-oxygen mixture, amplified into an explosive flame front which is projected into the combustion chamber to fire the vaporized fuel-air mixture. This flame front covers many times the area of that of the spark plug and, therefore, is of sufficient intensity to cause ignition and more efficient combustion of a fuel-air mixture that otherwise might be too lean to ignite with the spark alone.

Although the use of undiluted hydrogen and oxygen gases is preferred, an effective firing charge can still be produced even after one volume of hydrogen is diluted with up to three volumes of air. This allows use of even a smaller electrolytic cell with proportionately less electric power needed for generating the hydrogen and oxygen gases.

Referring now to FIGS. 6 and 7, there is shown one possible embodiment of a pump 37 that works well for low volume requirements. Sleeve-type pump cylinder 38 houses two small reciprocating pistons 40, 42. Piston 40, having a relatively long stroke, is mechanically synchronized with the engine crank (not shown) to arrive at the top of the stroke and delivering the highest pressure at the instant of firing (see FIG. 6). Piston 42, having a much shorter stroke, may also be synchronized. However, it has been found that it supplies the necessary compression only when spring loaded.

After firing by spark plug 24', pistons 40 and 42 move downward until piston 42 closes off port 44, which forms the entrance to the firing tube 20'. Stops (not shown) limit the vertical travel of piston 42 in such a manner that it will just clear port 44 in the up position (see FIG. 6) and close it off completely when in the down position (see FIG. 7). As piston 40 moves downward, a vacuum is created in the pump cylinder 38. Thus, when piston 40 clears port 46 in pump cylinder 38 (see FIG. 7), the hydrogen-oxygen mixture is drawn therein. As piston 40 rises, the hydrogen-oxygen mixture is compressed between it and spring loaded piston 42 until piston 40 reaches the top of its stroke and nearly contacts piston 42. Thus, piston 40 forces piston 42 upward until it clears port 44, thereby allowing the compressed hydrogen-oxygen mixture to flow into the firing tube 20'. After detonation of the hydrogen-oxygen mixture by spark plug 24' and the subsequent ignition of the fuel-air mixture in the combustion chamber, the cycle is repeated.

To better avoid the backfiring of the hydrogen-oxygen mixture into the feedline and the electrolytic cell in case of mishandling, the hydrogen and oxygen gases may be collected separately at the cell and recombined at the metering pump by a "Y" branch 48. The hydrogen and oxygen gases may be easily recombined at the intersection of the "Y" branches 48, since they are formed in stoichiometric proportions by the electrolytic cell (not shown).

As shown in FIG. 5, the capillary tube 20 may be connected directly to the combustion chamber of the cylinder 10'. However, for more efficient operation, a simple valve as shown in FIGS. 8 and 9 may be employed. The use of this valve prevents the hydrocarbon exhaust from backflowing into the firing tube and, thus ensures more complete purging as the fresh hydrogen-oxygen charge flows in.

The valve 50, which replaces the conventional spark plug, comprises a threaded portion 52 for insertion in the conventional spark plug socket and a hexagonal head 66. A firing tube 20'' passes through the threaded portion 52 and communicates with chamber 54 located at the lower end of the valve 50. The opensided chamber 54 is defined by a top plate 60 and a bottom plate 62 which are connected by vertical supports 64. A floating disc valve 56 is housed within chamber 54 immediately below the firing tube 20''. When the hydrogen-oxygen charge fires, the disc valve 56 is forced downward and the flame front is forced out of the open sides of chamber 54, thereby spreading the flame front around the combustion chamber for more complete combustion. As the fuel-air mixture in the combustion chamber is ignited (and the pressure in the firing tube decreases) disc valve 56 is forced upward closing off the entrance to firing tube 20''.

Apertures 58 in the bottom plate 62 of chamber 54 allow the differential pressure to lift the disc valve 56. Since the volume that is controlled through the firing tube 20'' is so small and the distance that disc valve 56 must move is very short, it can be quite thin and light so that it is easily operated by the changing pressures. For instance, the prototype is only 0.005 inches thick and 5/16ths of an inch in diameter.

It should be understood that although the present embodiment is shown in conjunction with a 4-cycle reciprocating piston engine, the present invention may also be adapted to work with 2-cycle engines, rotary engines or any other type of engine which derives its power from a series of explosive charges of liquid fuel-air mixtures. Thus, the foregoing description of a specific embodiment will so fully reveal the general nature of the invention that others can, by applying current knowledge, readily modify such specific embodiment and/or adapt it for various applications without departing from the generic concept, and therefore such adaptations and modifications should and are comprehended within the meaning and range of equivalents of the disclosed embodiment. Further it is to be understood that the phraseology and the terminology employed herein is for the purposes of description and not of limitation.

What is claimed is:

1. A combustion system for operating an internal combustion engine, having a main combustion chamber which may contain a vaporized fuel-air mixture, comprising:

igniting means located remote from the main combustion chamber for creating a spark;

supply means for supplying hydrogen and oxygen gases to said igniting means;

pre-combustion means housing said igniting means and connected to the main combustion chamber for projecting an explosive flame front created by the detonation of said hydrogen and oxygen gases by said igniting means into the main combustion chamber to ignite the vaporized fuel-air mixture when the fuel-air mixture is present in the main combustion chamber;

valve means connecting said pre-combustion means to the main combustion chamber for spreading said flame front around the main combustion chamber when said oxygen and hydrogen gases are detonated by said igniting means, wherein said valve means comprises;

a hexagonal head having a substantially planar surface;

an externally threaded portion connected at one end to said substantially planar surface and extending substantially perpendicularly therefrom;

a housing attached to the other end of said threaded portion and communicating with the main combustion chamber, said housing having open sides, a first plate abutting the other end of said threaded portion, a second plate having a plurality of apertures therein, a support member connecting said first and second plates and maintaining them in a substantially parallel relationship, and a disc valve movably sandwiched between said first and second plates; and transporting means communicating with said housing through said first plate for transporting said hydrogen and oxygen gases from said precombustion means to said housing through said hexagonal head and said threaded portion, wherein, during detonation of the hydrogen and oxygen gases by said igniting means, said disc valve is forced into contact with said second plate thereby forcing said flame front out of said open sides of said housing, and wherein, during firing of the vaporized fuel-air mixture, when it is present in the main combustion chamber, said disc valve is forced into contact with said first plate and said transporting means thereby preventing backflow of exhaust into the pre-combustion means.

2. The combustion system of claim 1 further comprising generating means connected to said supply means for forming hydrogen and oxygen gases in stoichiometric proportions.

3. The combustion system of claim 1 wherein said igniting means is a spark plug.

4. The combustion system of claim 1 wherein said supply means is a pump.

5. The combustion system of claim 2 wherein said generating means is an electrolytic cell comprising:

a casing;

an electrolyte in said casing, said electrolyte including water and sodium hydroxide;

a cathode immersed in said electrolyte;

an anode immersed in said electrolyte; and means for supplying electrical current to said cathode and anode;

whereby hydrogen is liberated at said cathode and oxygen is liberated at said anode.

6. The combustion system of claim 4 wherein said pump comprises:

a sleeve-type cylinder;

a first piston, having a stroke of a first length, mounted for reciprocating axial movement in said cylinder for regulating the supply of said hydrogen and oxygen gases; and a second piston, having a stroke of a second length longer than said first length, mounted for reciprocating axial movement in said cylinder and synchronized to arrive at the top of its stroke and delivering the highest pressure at the instant of detonation of said hydrogen and oxygen gases by said igniting means, whereby said hydrogen and oxygen gases are compressed between said first and second pistons and thereby forcibly supplied to said igniting means.

* * * * *